United States Patent
Wlaschin

Patent Number: 5,850,522
Date of Patent: Dec. 15, 1998

[54] SYSTEM FOR PHYSICAL STORAGE ARCHITECTURE PROVIDING SIMULTANEOUS ACCESS TO COMMON FILE BY STORING UPDATE DATA IN UPDATE PARTITIONS AND MERGING DESIRED UPDATES INTO COMMON PARTITION

[75] Inventor: Scott Wlaschin, Los Angeles, Calif.

[73] Assignee: DEX Information Systems, Inc.

[21] Appl. No.: 633,839

[22] Filed: Apr. 10, 1996

Related U.S. Application Data

[63] Continuation-in-part of Ser. No. 384,706, Feb. 3, 1995.

[51] Int. Cl.[6] ........................................ G06F 7/32
[52] U.S. Cl. .................. 395/200.45; 711/153; 711/173
[58] Field of Search ........................ 707/10, 8; 395/500, 395/200.45, 651; 711/153, 173

[56] References Cited

U.S. PATENT DOCUMENTS

| | | | |
|---|---|---|---|
| 4,897,782 | 1/1990 | Bennett et al. | 707/10 |
| 4,980,822 | 12/1990 | Brantley, Jr. et al. | 711/202 |
| 5,535,375 | 7/1996 | Eschel et al. | 395/500 |
| 5,566,331 | 10/1996 | Irwin, Jr. et al. | 707/10 |
| 5,634,122 | 5/1997 | Loucks et al. | 707/8 |
| 5,652,884 | 7/1997 | Palevich | 395/651 |

*Primary Examiner*—Thomas C. Lee
*Assistant Examiner*—David Ton
*Attorney, Agent, or Firm*—Irell & Manella LLP

[57] ABSTRACT

A distributed storage system provides a method and apparatus for storing, retrieving, and sharing data items across multiple physical storage devices that may not always be connected with one another. The distributed storage system of the present invention comprises one or more 'partitions' on distinct storage devices, with each partition comprising of a group of associated data files. Partitions can be of various types. Journal partitions may be written to by a user and contain the user's updates to shared files. In the preferred embodiment, journal partitions reside on a storage device associated with a client computer in a client-server architecture. Other types of partitions, library and archive partitions, may reside on storage devices associated with a server computer in a client-server architecture. The files on the journal partitions of the various clients may, at various times, be merged into a consolidation file or a file resident within the library partition. If two or more clients attempt to update or alter data related to the same file, the system resolves the conflict between the clients to determine which updates, if any, should be stored in the library partition. The merge operation may occur at various time intervals or be event driven. The archive partition stores files from the library partition.

13 Claims, 11 Drawing Sheets

SYSTEM FOR PHYSICAL STORAGE ARCHITECTURE PROVIDING SIMULTANEOUS ACCESS TO COMMON FILE BY STORING UPDATE DATA IN UPDATE PARTITIONS AND MERGING DESIRED UPDATES INTO COMMON PARTITION

REFERENCE TO RELATED APPLICATIONS

The present application is a Continuation-in-Part of the Application entitled "Method and Apparatus for a Physical Storage Architecture for a Shared File Environment" filed Feb. 3, 1995, Ser. No. 08/384,706, now pending, which is herein incorporated by reference.

BACKGROUND OF THE INVENTION

1. Field of the Invention

The present invention relates generally to a method and apparatus for storing, retrieving, and distributing various kinds of data. More specifically, the present invention relates to a physical storage architecture for a shared file environment such as a client-server network.

2. Art Background

Over the last 30 years, computers have become increasingly important in storing and managing information. This has lead, in turn, to the widespread sharing and communication of data such as electronic mail and documents over computer networks. To support the sharing of data, client-server architectures have become increasingly commonplace which allow users to access files on a server. In particular, it has become common to enable many users to access the same database that resides in a server or servers.

Most current database architectures are designed for continuous access to a single set of data files. The single set of files can be shared directly or indirectly as in a client-server network. This approach encounters difficulties when users at many physical sites need to access the same data simultaneously at different client computers.

There are three common approaches to the problem of simultaneous access. According to the first approach, all the users must access a single site, typically a computer mainframe. According to the second approach, each site has an exact copy of the data at the other sites, all of which copies are kept synchronized in real-time using algorithms such as two-phase commit. The third method dictates that each site has a copy of the data at the other sites, that the copies are not always the same, and a synchronization of the copies must occur at some regular interval. This is known as a synchronous replication.

Current database architectures are designed for continuous access to all data files, and hence work well with the mainframe and two-phase commit approach. In situations when continuous access is not guaranteed, however, the systems operating according to these approaches do not function properly.

Client-server systems designed for desktop information management and local area networks uniformly use one of the first two approaches described above. These approaches tend to provide an imbalanced load on the server and typically require locking of the shared files on the remote server which further hampers performance. In addition, the files resident on the server typically require a connection to the client and thus updates may not occur without such a connection. The first two approaches also tend to be relatively slow for updates as updates must be synchronized in real-time.

The present invention overcomes the limitations of the prior art by providing a flexible, efficient and fast physical storage system that combines the advantages of a synchronous replication with the need for direct access to central data. It is designed to be used as a file system that allows users to share files on networks and across different storage media such as hard-drives, CD-ROMS and WORM drives.

Current physical storage systems suffer from limitations in addition to the synchronization problems previously discussed. A physical storage system must store data items, such as a database record, in a non-volatile memory until such time as an application requires access to such data. This process typically involves 'flattening' the contents of data items and writing them to the storage medium. The storage medium is generally divided into fixed size blocks, each of which has a location.

According to prior art storage systems, there are two restrictions that can ease the design of such a system. The first restriction is that each data item be a fixed length. The second restriction is that only the most recent version of each data item need be stored. Prior art storage systems generally operate according to one or both of these restrictions. In a typical storage system, a block of memory is found that is large enough to hold a data item, which is then written to that block. When an item is deleted, the other items in the block are reorganized to free up the maximum amount of space, ready for another data item. A new block is created only when no existing block has enough space for a new data item.

The prior art approach has numerous disadvantages. Prior art systems do not readily support variable length data and previous versions of a data item are not available, so that no 'undo' function is available to the user. Further, the prior art methods may not be used in conjunction with append-only media such as write-once read-many (WORM) disks.

As will be described, the present invention overcomes the limitations of prior art storage systems by providing a system that easily supports variable length data items without erasing older versions of data items while occupying a relative minimum of disk space.

SUMMARY OF THE INVENTION

The distributed storage system of the present invention provides a method and apparatus for storing, retrieving, and sharing data items across multiple physical storage devices that may not always be connected with one another.

The distributed storage system of the present invention comprises one or more 'partitions' on distinct storage devices, with each partition comprising a group of associated data files which in turn contain a collection of data items, each of which can be accessed individually. Partitions can be of various types. Journal partitions may be written to by a user and contain the user's updates to shared data items. In the preferred embodiment, journal partitions reside on a storage device associated with a client computer in a client-server architecture. Other types of partitions, library and archive partitions, may reside on storage devices associated with a server computer in a client-server architecture.

The data items on the journal partitions of the various clients may, at various times, be merged into a data item resident within a new, consolidated partition. If two or more clients attempt to update or alter data related to the same data item, the system resolves the conflict between the clients to determine which updates, if any, should be stored in the consolidated partition. The merge operation may occur at various time intervals or be event driven. At other various times, the consolidated partition can optionally be merged into the library partition, which maintains a shared version of a data item. The archive partition stores older versions of data items from the library partition.

Multiple journal partitions can share the same library and archive partitions, which provides a means for providing the data items in the library and archive partitions as shared, while allowing the data items in the journal partition to have a local version, independent of data items in other journals or shared data items.

In the preferred embodiment, the journal partition of the present invention comprises a series of objects that are written sequentially to physical memory. The journal partition stores older versions of objects such that a user may retrieve data that had been changed. The objects correspond to data items, such as a record in a database or a text file. A table is stored to track the location of objects within the journal partition.

NOTATION AND NOMENCLATURE

The detailed descriptions which follow are presented largely in terms of algorithms and symbolic representations of operations on data bits within a computer memory. These descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar digital devices. In all cases there should be borne in mind the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

A data item as referred to herein corresponds to a discrete element of data that a user may wish to access. For example, a data item may comprise a particular record of a database or a particular field within a record of a database. A data item may comprise a word processing file or any other type of file. A data object as referred to herein stores a version of a data item. Different versions of the same data item may be stored in different data objects. For example, an original version of a text file and an updated version will be stored in two different data objects that each correspond to the same data item, the actual text file.

A domain describes the type of a particular data item and is used consistently with the terminology in the copending Application entitled "Method and Apparatus for Improved Information Storage and Retrieval System" filed Feb. 3, 1995, Ser. No. 08/383,752. Thus, for example, a particular data item may be of the text, number or Boolean domains, or a user defined domain.

DETAILED DESCRIPTION OF THE INVENTION

The present invention discloses methods and apparatus for data storage, manipulation and retrieval. Although the present invention is described with reference to specific block diagrams, and table entries, etc., it will be appreciated by one of ordinary skill in the art that such details are disclosed simply to provide a more thorough understanding of the present invention. It will therefore be apparent to one skilled in the art that the present invention may be practiced without these specific details.

Moreover, certain terms such as "knows", "verifies", "stores", "finds", "replaces", "examines", "determines", etc. may be used in this Specification and are considered to be terms of art. The use of these terms, which to a casual reader may be considered personifications of computer or electronic systems, refers to the functions of the system as having human like attributes, for simplicity. For example, a reference herein to an electronic system or computer program "determining" something is simply a shorthand method of describing that the electronic system has been programmed or otherwise modified in accordance with the teachings herein. The reader is cautioned not to confuse the functions described with every day human attributes. These functions are machine functions in every sense.

Local System Hardware

Figure 1:
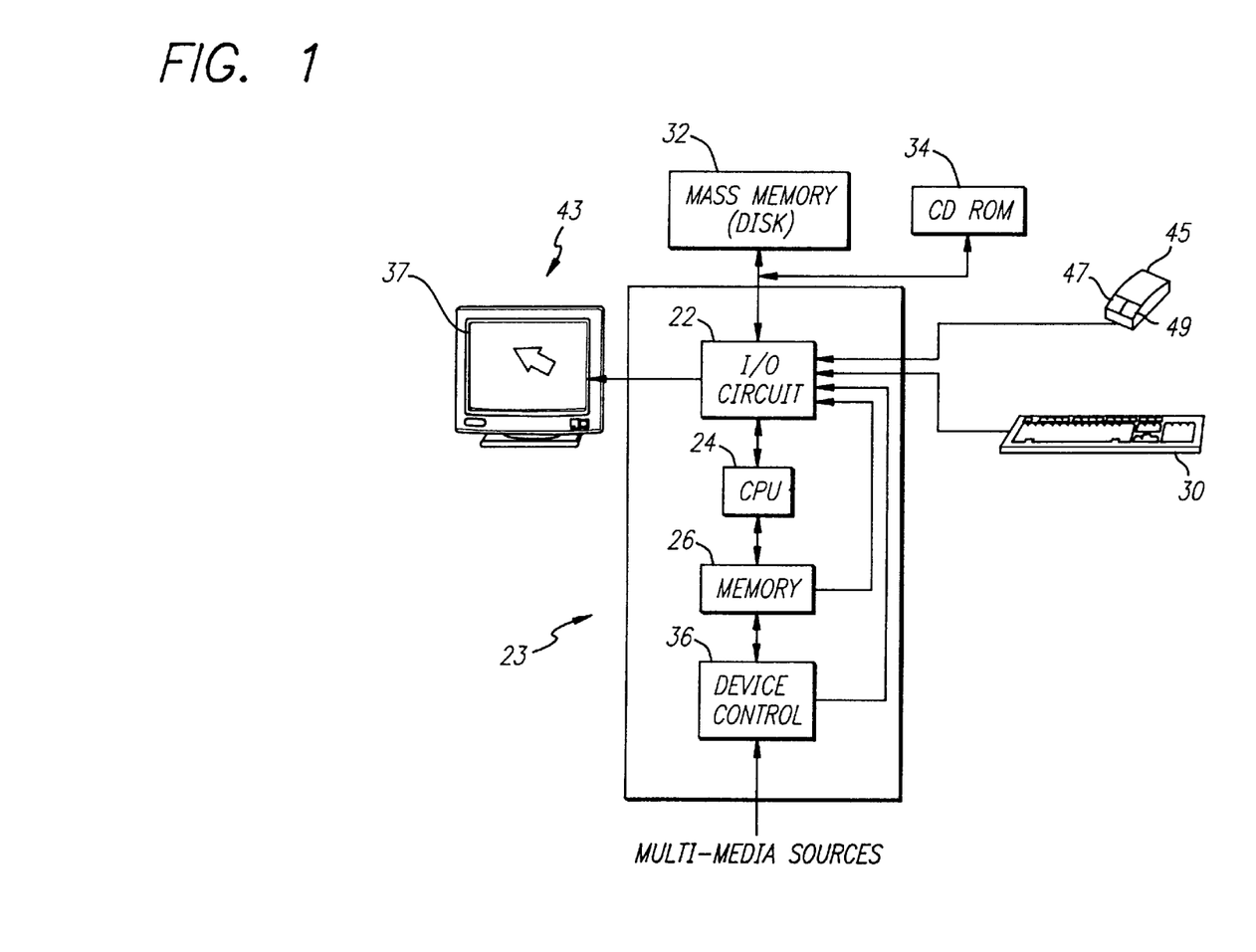
FIG. 1 is a functional block diagram illustrating one possible computer system incorporating the teachings of the present invention.

Referring to FIG. 1, one representative information storage and retrieval hardware configuration incorporating the teachings of the present invention is conceptually illustrated. As shown, the information storage and retrieval system includes a computer 23 which comprises four major components. The first of these is an input/output (I/O) circuit 22, which is used to communicate information in appropriately structured form to and from other portions of the computer 23. In addition, computer 20 includes a central processing unit (CPU) 24 coupled to the I/O circuit 22 and to a memory 26. These elements are those typically found in most computers and, in fact, computer 23 is intended to be representative of a broad category of data processing devices.

Also shown in FIG. 1 is a keyboard 30 for inputting data and commands into computer 23 through the I/O circuit 22, as is well known. Similarly, a CD ROM 34 is coupled to the I/O circuit 22 for providing additional programming capacity to the system illustrated in FIG. 1. It will be appreciated that additional devices may be coupled to the computer 20 for storing data, such as magnetic tape drives, buffer memory devices, and the like. A device control 36 is coupled to both the memory 26 and the I/O circuit 22, to permit the computer 23 to communicate with multi-media system resources. The device control 36 controls operation of the multi-media resources to interface the multi-media resources to the computer 23.

A display monitor 43 is coupled to the computer 23 through the I/O circuit 22. A cursor control device 45 includes switches 47 and 49 for signaling the CPU 24 in accordance with the teachings of the present invention. Cursor control device 45 (commonly referred to a "mouse") permits a user to select various command modes, modify graphic data, and input other data utilizing switches 47 and 49. More particularly, the cursor control device 45 permits a user to selectively position a cursor 39 at any desired location on a display screen 37 of the display 43. Although FIG. 1 illustrates a mouse and keyboard as input devices, it will be appreciated that a variety of other input devices including trackballs, data gloves, touch screens and the like may be used as functionally equivalent input devices by the present invention.

System Structure

The present invention comprises two main components. The first component is a distributed file architecture that permits two or more users to access a common file. The second component is the physical storage system within the local computer 23 that supports variable length data items and maintains previous versions of the data items. The Specification will discuss these components in turn.

Distributed Architecture

Figure 2:
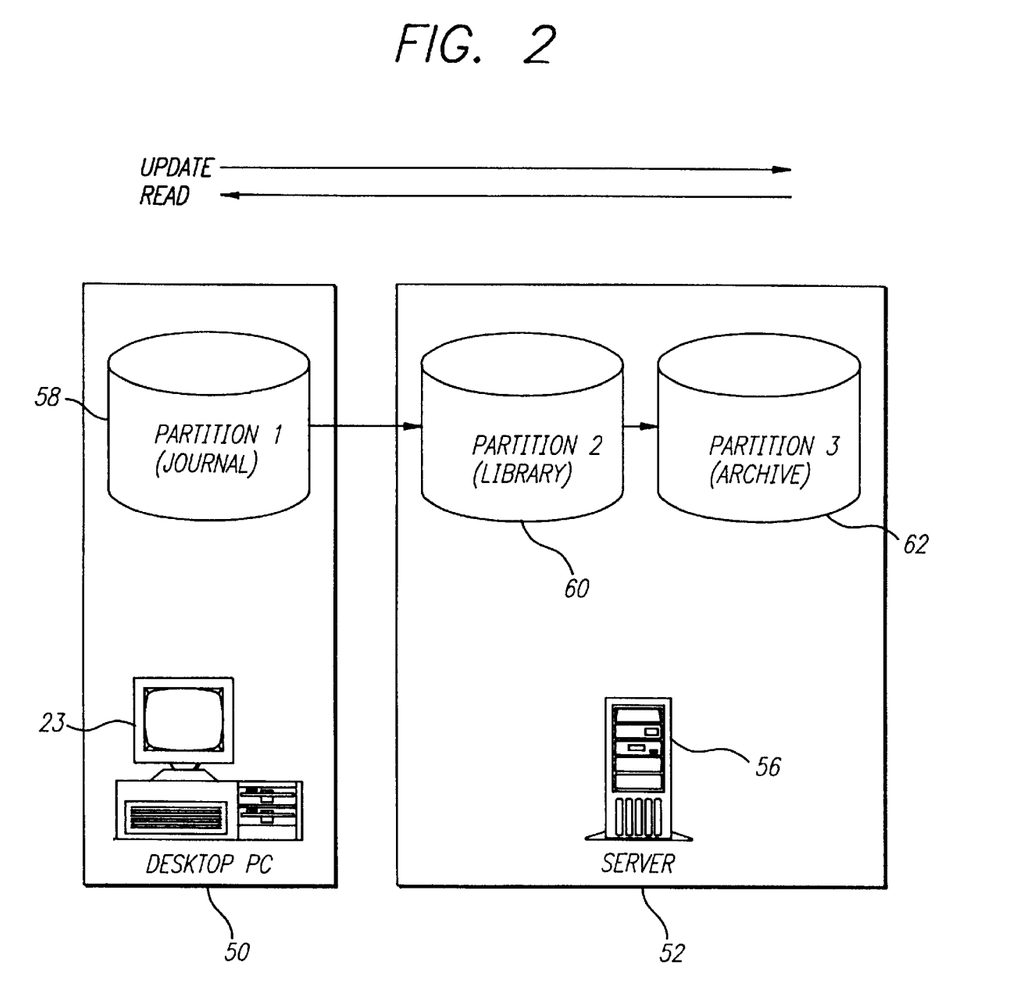
FIG. 2 is a block diagram illustrating the partition structure of the present invention in a client-server architecture.

FIG. 2 illustrates an overview of the physical storage architecture of the present invention. As shown, the computer 23, commonly known as a client, communicates with a remote computer 56, commonly known as a server, that contains database files and other files that the computers 23 and other computers may access.

NOTE: The transmission of data items between physical locations can occur over any network communication system, including, but not limited to: TCP/IP, Novell IPX, and NetBEUI. The packaging protocol used to transmit data items may be any standard scheme for transmitting data, including, but not limited to: File transfer protocols such as FTP, Modem transfer protocols such as ZMODEM, Email protocols such as SMTP, Hypertext Transport Protocol, and so on.

The design of the physical storage system

Difficulties arise where two users simultaneously attempt to update the same file that resides on the server 56.

To avoid the difficulties typically associated with simultaneous access, the present invention divides the physical storage system into partitions where each physical device contains at least one partition. Each partition comprises one or more associated data files. As illustrated in FIG. 2, the client computer 23 includes a journal partition 58 stored on the disk 32 while the server 56 includes a library partition 60 and an archive partition 62 that reside on the same or different storage devices within the server 56.

As will be readily appreciated, FIG. 2 illustrates one type of architecture structured according to the teachings of the present invention. For example, other possible combinations may include, but are not limited to, the following: a) the library partition 60 may reside on a CD-ROM and the journal partition on a client computer 23. b) all three partitions may reside on the client computer 23, c) the journal partition is on a network server, one library partition is on the same server, and a second library partition is connected remotely over the Internet.

A particular list of linked partitions is called a 'partition chain', as illustrated by partitions 58, 60 and 62 in FIG. 2. A partition chain may contain any number of partitions, including one. In the preferred embodiment, the partition 58 nearest the user is called the 'update partition' and must be a journal partition and is the only partition in the chain that can be updated directly. The other partitions, 60 and 62, are 'remote partitions' and are read-only partitions such that they can be read from but not written to directly.

Partitions may be classified according to various types, depending upon the function of the partition. A journal partition such as the partition 58 comprises at least one append-only journal file as will be described more fully below. A library partition, such as the partition 60, stores a 'packed' version of the journal partition, containing only a single version of each data item. An archive partition, such as the partition 62, stores multiple historical versions of the data. Other types of partitions are possible. Generally, journal, library and archive partitions are linked together as illustrated in FIG. 2.

Updates to files, such as database and word processing files, are not written directly to the library partition 60. Instead, updates are stored in the journal partition 58 immediately and then provided to the server 56 and merged into the library partition 60 at some later time.

Figure 3:
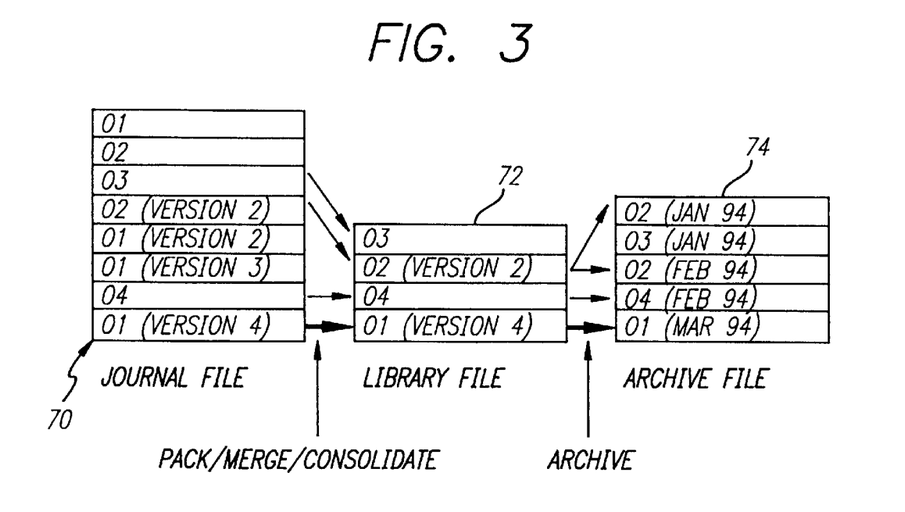
FIG. 3 illustrates the linkage between the partitions of FIG. 2 and shows how files are transferred from one partition to another.

FIG. 3 illustrates the linkage between the journal partition 58, the library partition 60 and the archive partition 62. A journal file 70 residing within the journal partition 58 includes various data objects, for example database records, and the file may also contain unused memory. At a later time, the journal file 70 is packed and consolidated into a new consolidation file 70 which can be inserted in the partition chain between the now empty journal files, and the library file. The consolidated journal file may be optionally packed and then stored in a library file 72 stored within the library partition 60. In turn, the server 52 may write the library file 72 to an archive file 74, stored within the archive partition 62. The archive file 74 contains multiple versions of the same data object.

Appendable data items

In many applications, the library may contain a large data item such as an item which stores a list of 10,000 pointers to objects or a large text document. In these cases, updating the value of the data item would cause an unnecessary duplication of the data.

The physical storage system of the present inventions supports 'appendable' data items, which distribute the storage of their contents across multiple partitions. An appendable data item keeps track of the changes to the original data and stores only the changes to the original data in the journal.

Figure 4A:
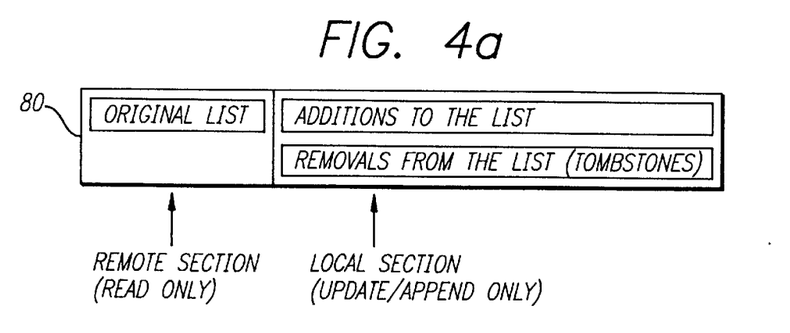
FIG. 4a illustrates the structure of an appendable list data item that may exist within more than one partition.
Figure 4B:
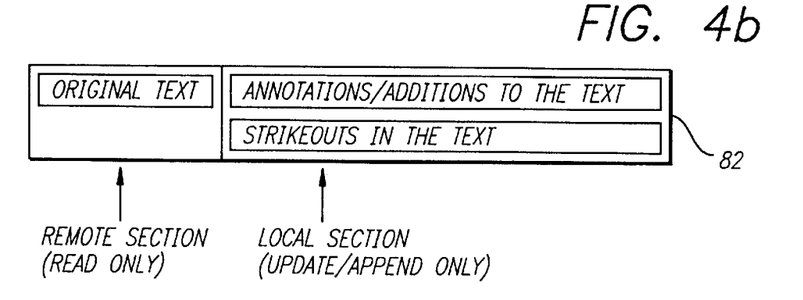
FIG. 4b illustrates the structure of an appendable text data item that may exist within more than one partition.

The internal structure of an appendable data item comprises two parts, a 'remote' section, where the original data is stored, and a 'local' section, where the changes are kept. FIGS. 4a and 4b show two implementations of appendable items for a list and text data, respectively. FIG. 4a illustrates a list data item, which comprises an original list stored a remote partition and additions and removals from the list stored in a local partition. The original list is a read only list and any updates must be written to the update list. Changes might be stored as identification numbers to add to the original list, and identification numbers to remove from the original list.

Similarly, FIG. 4b illustrates a text data item stored as an appendable list 82, which comprises original text stored in a remote partition and additions and deletions from the text stored in a local partition. The original text is stored such that it is read only text and any updates must be written to the local partition. The changes might be stored as a series of editing actions such as insertions, deletions, and formatting actions.

The use of appendable data items is advantageous. They allow the storage requirements for updates to be minimized since the original information need not be stored in the local partition. Further, they reduce synchronization problems since the local partition stores only the changes to the original data and not the original data itself. Finally, the use of appendable data items allows read-only media such as CD-ROMs and one-way electronic publishing services to be annotated.

Shared vs private data items

Multiple partition chains can share some or all of the same library and archive partitions, which provides a means for providing the data items in the library and archive partitions as shared, while allowing the data items in the journal partition to have a local version, independent of data items in other journals or shared data items.

During consolidation, the various journal files can be consolidated to various degrees, by excluding certain data items from consolidation. Furthermore, the consolidation file itself can act as a new partition without being merged into the prior library partition.

In this way, 'layers' of data items can be constructed, with each layer masking out portions of the previous layer.

For example, consider the following situation: the partition chain for user X contains a data item A1 in its journal file; the partition chain for user Y contains a data item B1 in its journal file, and both chains contain a library partition C which has a data item C1, and an older version of data item A1, called A2. In this situation, user X will see data items A1 and C1, but B1 will be hidden from him. User Y will see data items B1 and C1, and will see the older version A2 of A1, which resides on partition C.

Using the storage system to provide layers in this way, users of the storage system can maintain personal versions of certain data items, while still having the benefits of sharing other data items. Furthermore, the various layers can serve various purposes, for example, there could be a four layer system, with the layers defined as follows: the first layer can be personalized for a single user, the next layer can contain shared information for a workgroup, the succeeding layer can contain shared information for a company-wide information system, and the final layer can contain publicly shared information.

Inserting new layers

The current invention provides for the advantageous ability for users to exchange subsets of their data items with each other by using the layer method. A user X can create a new partition (A, say) based on a subset of his data, and transmit it to another user Y, using any standard data transfer system as described above. User Y can then insert the partition A into his partition chain with the result that all of the data items in Partition A immediately and transparently appear to be part of user Y's data set, unless a particular data item was masked by a 'higher' layer.

This ability can be advantageously applied to such requirements as: synchronizing users who are not sharing a centralized system, shipping updates and annotations to a read-only published medium such as a CD-ROM, and gathering and consolidating information from distinct sources.

Merging

As previously described, the system provides the consolidated contents of the journal partition 58 to the library partition 60 according to clock intervals or the occurrence of events. The user of the system may define those conditions that trigger such a merge operation such as when the journal partition 58 contains a specified amount of data or when a certain amount of transactions have occurred since the most recent merge operation.

Figure 6:
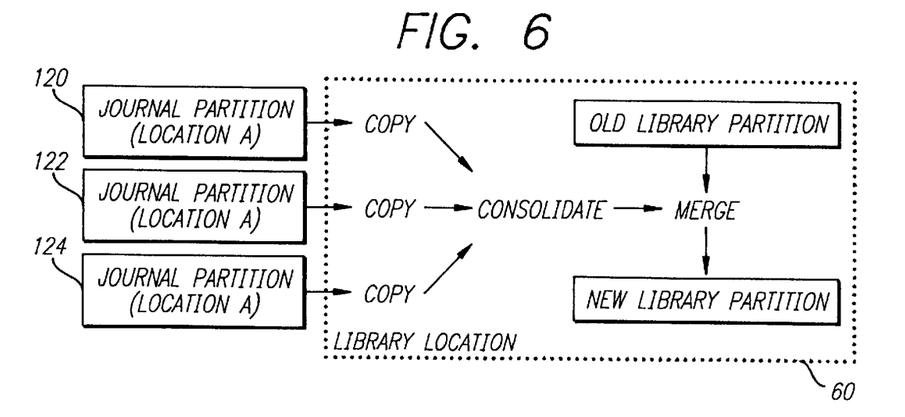
FIG. 6 is an illustration of an operation for merging files located in a journal portion to a file located in a library partition.

When the updates are merged into the library partition 60, older versions from the library partition 60 are relocated to the archive partition 62. FIG. 6 illustrates a merge operation, where a plurality of data items 120, 122 and 124 in different locations within the journal partition 58 are copied and the copies provided to the library partition 60 where they are consolidated and merged with the other data in the library partition 60. To decrease transmission time from the journal partition 58 to the library partition 60, the data items may be compressed according to a data compression algorithm.

Figure 7:
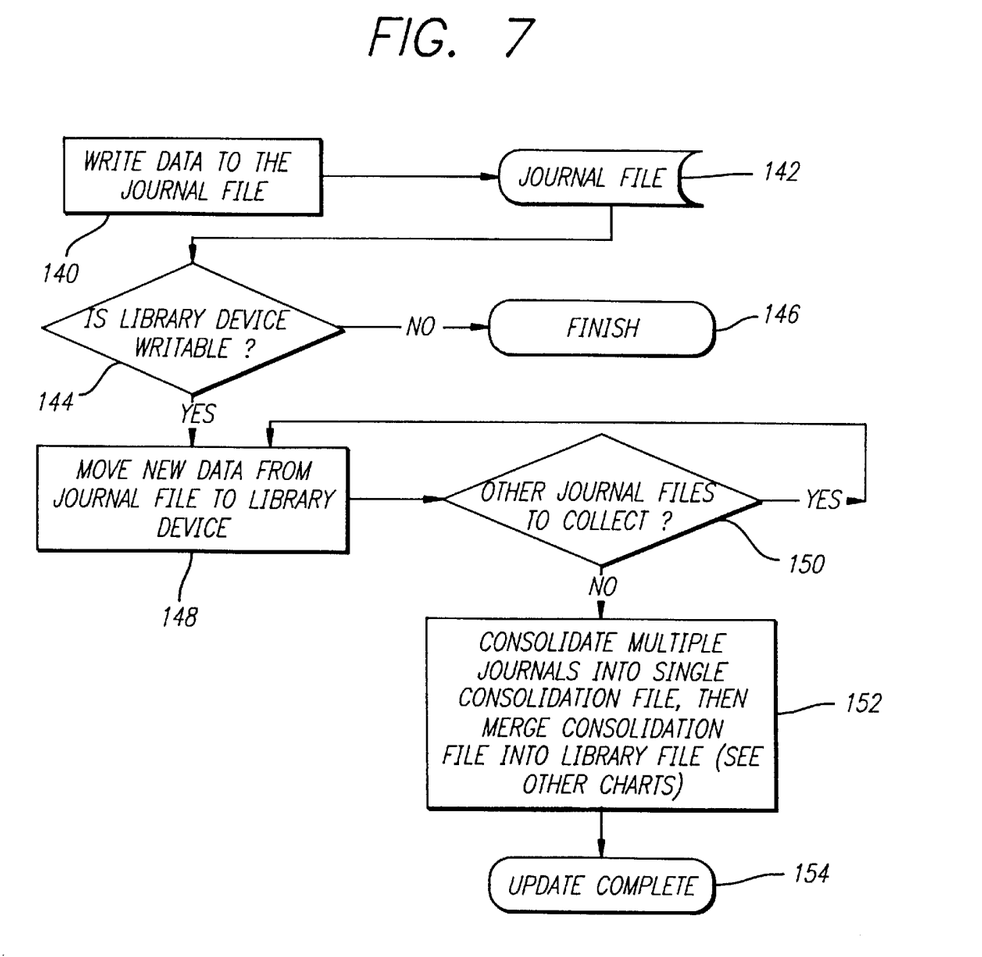
FIG. 7 is a flow chart illustrating the sequence of steps of the present invention for writing data to a consolidation file.

FIG. 7 is a flow chart for a merge operation. At blocks 140 and 142, data is written to a file in the journal partition 58. At block 144, the system determines whether the device on which the library partition 60 resides may be written to. If the device is a read-only device such as a CD-ROM, then the merge process cannot occur, and the routine halts at block 146. Otherwise, the system branches to block 148 where data is provided to the library partition 60 from the journal partition 58. At block 150, the system determines whether other journal files need to be merged. If so, the system branches back to block 148. Otherwise, the system consolidates multiple data items from the journal partition 60 into a single consolidation file and the file is merged into the library file, as illustrated in block 152. Subsequently, the routine exits, as illustrated in block 154.

When two or more users attempt to modify the same file, a conflict will emerge during a merge operation. The system must decide whether both updates may be permitted, and, if not, which of the two updates, if either, should be stored. The consolidation procedure as previously described must resolve these conflicts.

Figure 8:
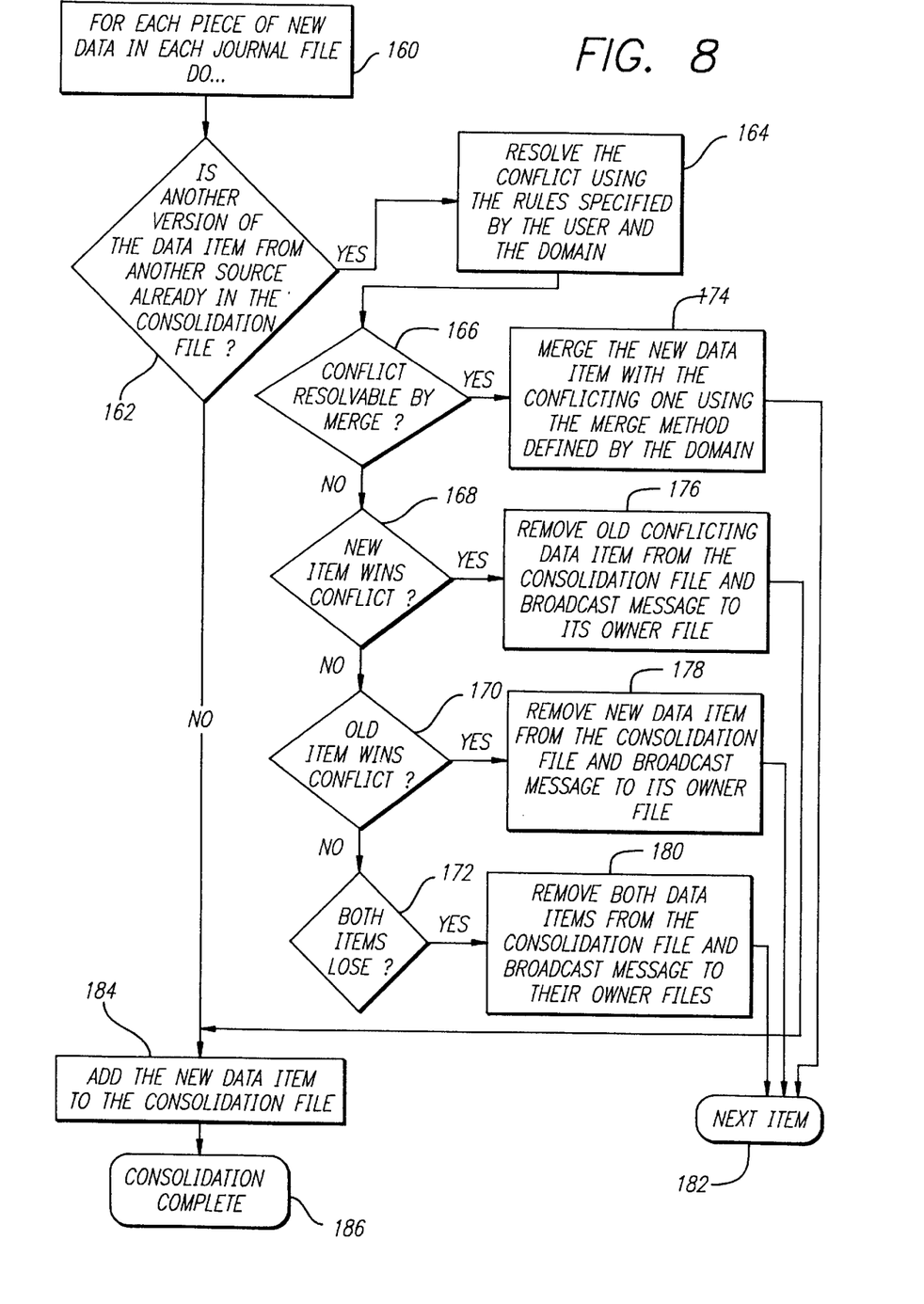
FIG. 8 is a flow chart illustrating the sequence of steps of the present invention for consolidating the consolidation file.

FIG. 8 is a flow chart for the consolidation procedure. At block 160, the routine initializes and a new 'consolidated' file is created which will eventually contain all the data from the journal files. For each journal file in turn, and each data item in each journal file, the routine attempts to add the data item to the consolidation file.

At block 162, the routine determines whether another version of the data item from another source, usually a device associated with a different user, already exists within a consolidation file. If not, the new data is added to the consolidation file at block 184 and the routine exits at block 186. If another version of the data item from another source already exists within the consolidation file, block 162 branches to block 164 and the conflict between the versions is resolved by applying the rules specified by the user or specified by the type of data object. In certain instances, the conflict may be resolved by a merge operation. For example, two changes to a text document that do not overlap can be merged. If the routine solved the conflict in block 164, block 166 branches to block 174 where the new data is merged with the data from another source using the method defined by the user or object type (domain). The system then retrieves the next item at block 182.

If the routine did not solve the conflict in block 164, block 166 branches to block 168 where the system determines whether the new item or the item from another source will be stored. If the new item wins the conflict and will thus be stored, block 168 branches to block 176 where the item from another source is removed from the consolidation file and a message provided to the user that created the item from another source to inform that user that the data item will not be stored. Subsequently, the routine branches to block 182. The winner of the conflict may be determined by a number of rules, including but not limited to, which item had the most recent timestamp or the higher value. Alternatively, the routine may give priority to the user with a higher status journal file or the user who entered the information.

If the new item does not win the conflict in block 168, block 168 branches to 170 where the system determines whether the item from another source wins the conflict. If so, block 170 branches to block 178 and the new data item is removed from the consolidation file and a message provided to the user that created the new data item and the routine branches to block 182. Finally, if neither the new item nor the item from another source wins the conflict, both data items are removed from the consolidation file and a message provided to the users of both items. Subsequently, the routine branches to block 182.

At this point, the old journal files can be cleared, ready to be updated again. If the library file must be left unchanged, the routine can halt and the consolidation file can be inserted in the partition chain as a new library partition, creating a new 'layer' as described above. Otherwise, the consolidation file can be, in turn, merged with the library file.

Figure 9:
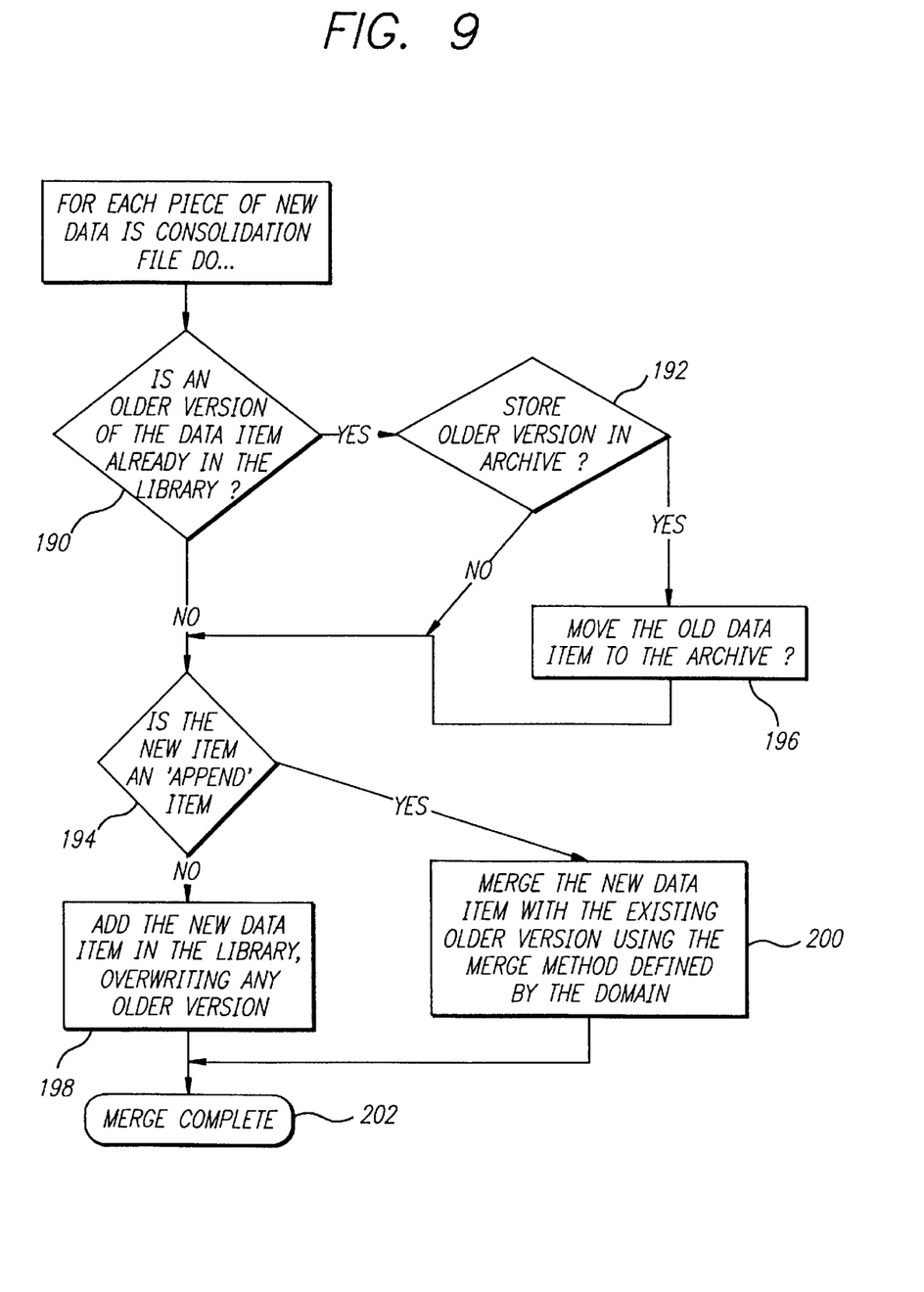
FIG. 9 is a flow chart illustrating the sequence of steps of the present invention for merging the consolidation file into a library file.

FIG. 9 is a flow chart for merging a consolidation file with a library file. At block 190, the routine determines whether an older version of the data item already exists in the library file, and, if not, the routine branches to block 194. Otherwise, block 192 determines whether the older version is to be preserved. If so, the older version is transferred to the archive file as illustrated in block 196. If the older version is not to be preserved, it is deleted, and block 192 branches to block 194.

At block 194, the system determines whether the new item comprises an appendable record that must be stored with its parent. If so, the new data item is merged with the existing older version using the merge method defined by the domain and the routine exits at block 202. According to the present invention, data may be merged from multiple sources, none of which need to be connected to the device upon which the library partition resides. If the new item is not an appendable record, block 194 branches to block 198 and the new data item is added to the library file, overwriting any older version. At block 198, as an option, the old version may be archived. Subsequently, the routine exits at block 202.

Reading and Writing Data Items

Since an appendable data item contains data residing within different partitions, reading and writing appendable data items requires that the system access the relevant partitions. When a user modifies an appendable data item through inputs from the keyboard 30 into the memory 26, the original contents are stored separately in the memory 26 from the changes and an 'append flag' is set for the item. When data items are written to permanent storage, such as the partition 58 within the memory 32, the system determines whether the 'append flag' is set, and, if so, only the changed part of the appendable item is written. The original data already resident on a different partition is not written since it can be reconstructed from the original read-only partition. However, to ensure the integrity of the system, a unique identification number representing the original data is also stored so that the system can detect if the original data is missing or changed.

Figure 5:
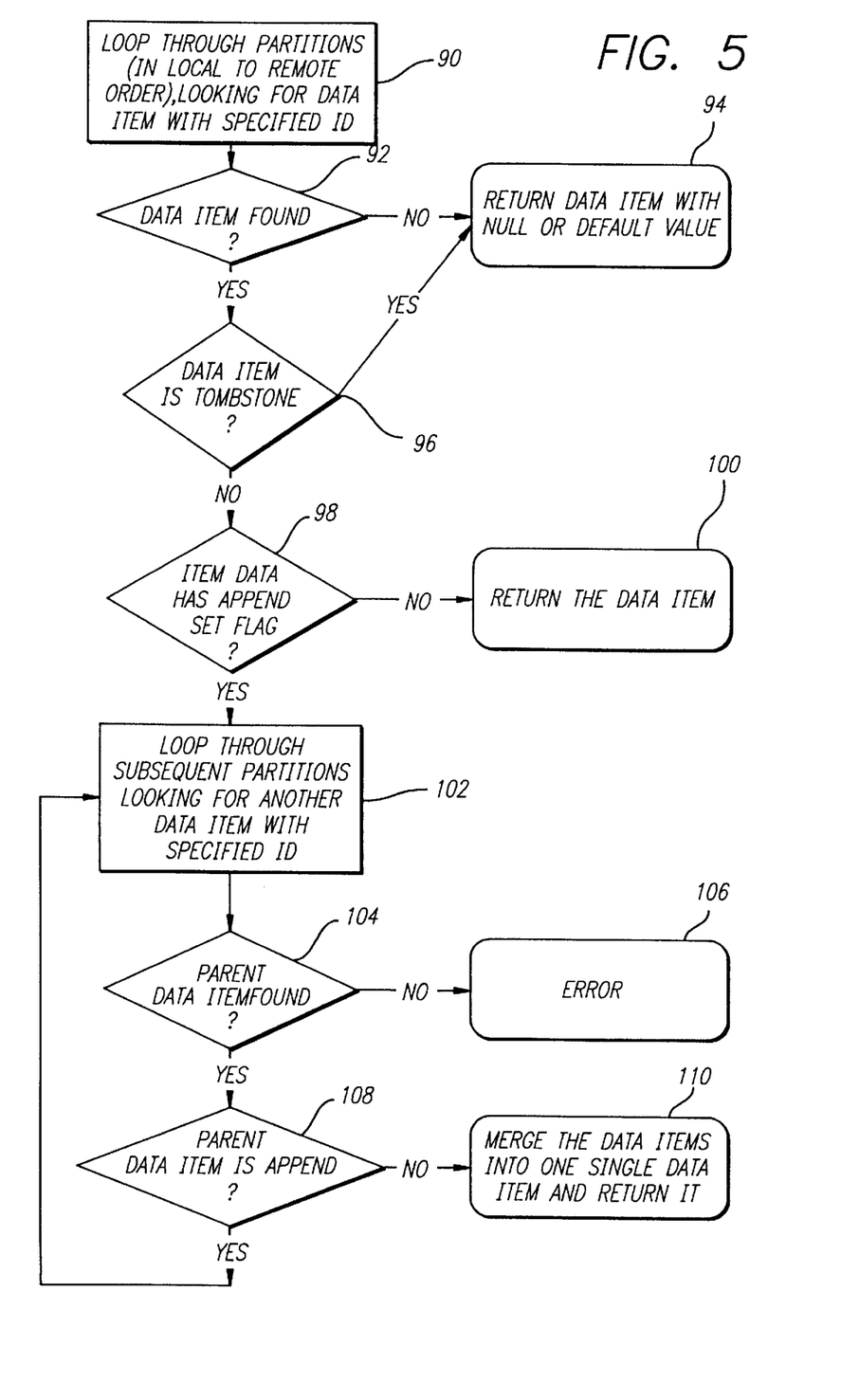
FIG. 5 is a flow chart for reading and writing data items according to the teachings of the-present invention.

When reading a data item, the system determines whether the item's 'append' flag is set. If so, the system attempts to read the original data from a partition containing the original data, and merge the original data with the changes. FIG. 5 is a flow chart for reading data according to the teachings of the present invention. At block 90, the system first searches any local journal partitions and then searches remote partitions in order, such as the library partition and then the archive partition, to find a data item with the identification number of the data item being read. If the system cannot locate any data items, block 92 branches to block 94 and a "NULL" or default value is returned.

Conversely, if the system finds a data item, block 92 branches to block 96, and the system determines whether the data item is a "tombstone," that is, whether the particular data item has been deleted. If so, the system branches to block 94. Otherwise, at block 98 the system determines whether the append flag of the item is set and, if not, the system returns the data item as shown in block 100. If the append flag is set, indicating a appendable item, at block 102, the system searches other partitions to find other data items with the same identification number. If no parent data item is found, the system branches from block 104 to block 106 where the system indicates an error since an append flag implies that a parent data item exists.

If the system finds a parent data item, the system determines whether the parent data item's append flag is set at block 108, which indicates whether the parent has its own parent. If so, the routine branches back to block 102 where the next partition, in order, is searched. When the routine locates all related data items, they are merged into one item and returned, as illustrated in block 110.

Missing Partitions

One of the advantages of the current invention is that reading and writing of data items does not require all partitions to be present at all times. If data is mainly read from (and always written to) the journal partition, then some or any of the library and archive partitions can be absent without detrimental effect. In particular, the current invention provides for processing data over an unreliable or completely disconnected partition chain.

For example, a user may have a journal partition and small, local library partition on a laptop computer. At certain times, the user can connect to a network to access a much larger master library partition and archive partition, but can also disconnect from the network and still be able to enter and retrieve data items successfully. While the user is connected to the network, consolidation of the journal file may occur, if desired, after which a new journal and library file can replace the prior versions.

Furthermore, this same approach can be applied to other disconnectable partitions, including, but not limited to, partitions stored on: removable disks, CD-ROMs, Internet servers, and so on.

Journal File

This section describes the preferred embodiment of the journal partition 58. The journal partition 58 can store variable length data items, such as a free text database record, on a storage medium such that prior versions of these same items can be retained.

Figure 10:
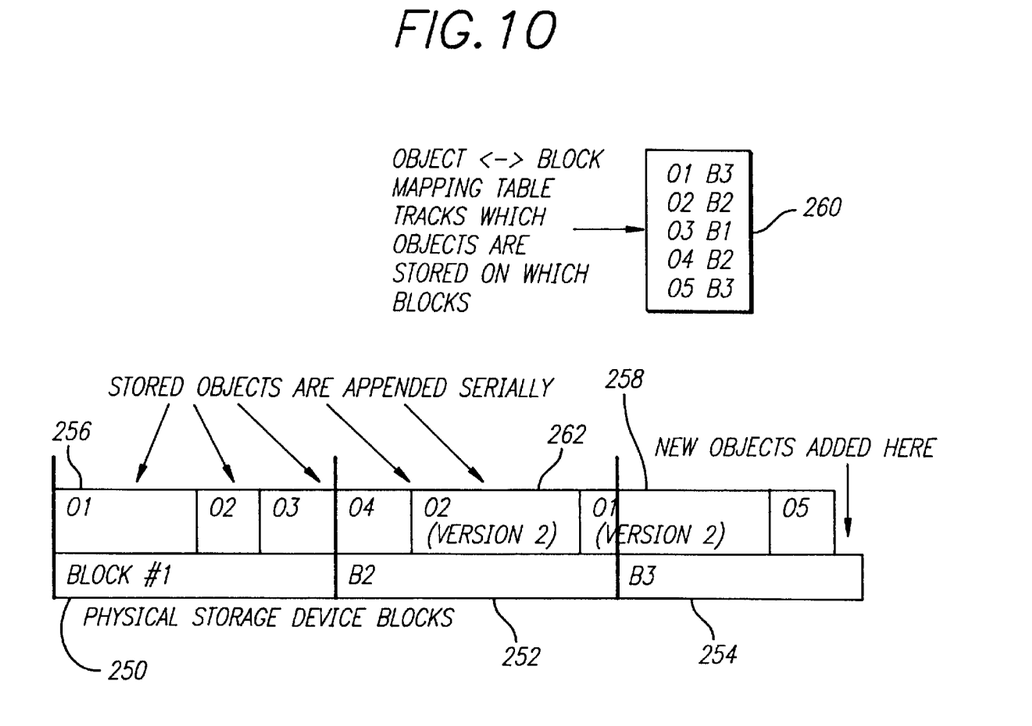
FIG. 10 illustrates the structure of a journal partition file in the preferred embodiment.

FIG. 10 illustrates the structure of the journal partition 58. The journal partition may reside on the mass memory 32 of FIG. 1. As illustrated in FIG. 10, the memory that includes the journal partition 58 is divided into physical storage device blocks 250, 252 and 254. Data objects, including data objects 256, 258 and 262, are stored within the blocks 250, 252 and 254.

As illustrated in FIG. 10, data objects to be stored in the journal partition 58 are appended serially to the memory and the blocks 250, 252 and 254 are not overwritten. Thus, the journal partition 58 may include older versions of the same data object. For example, a data object 256 may comprise a database cell including information about a company's employees and data object 258 may represent that cell after a user has updated it. The system creates a new block when needed and the system stores a table 260 that relates objects to their respective blocks. The table 260 is updated each time an object is written to a block.

Figure 11:
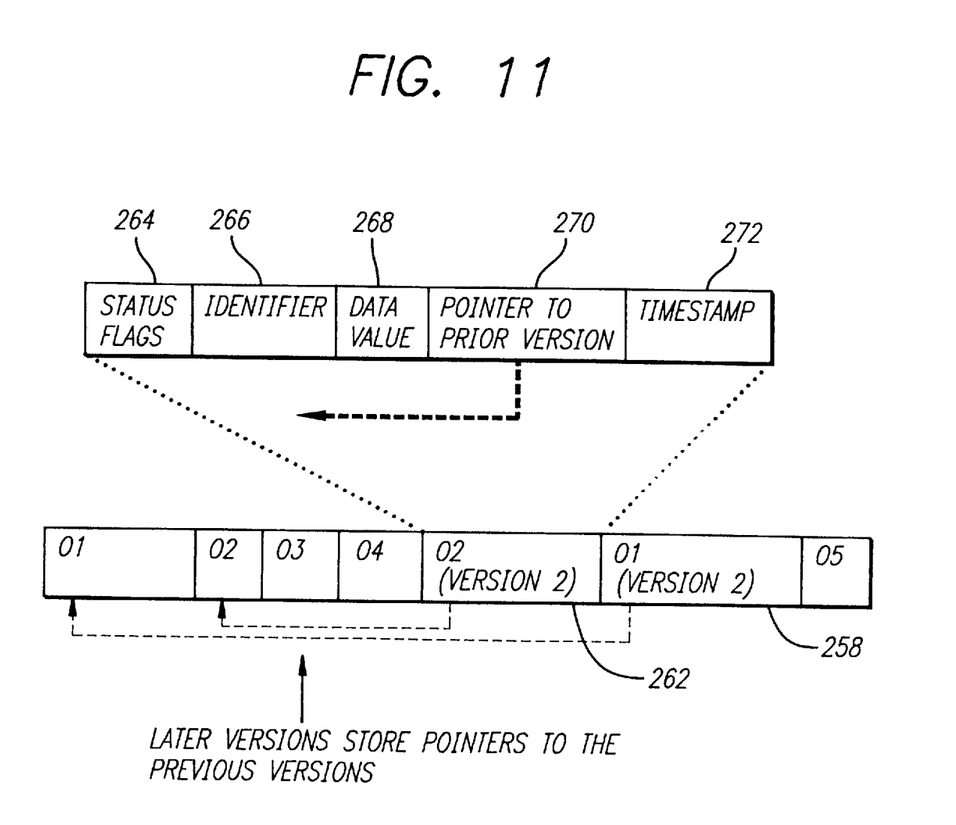
FIG. 11 illustrates the structure of an object stored in the journal partition.

FIG. 11 shows the contents of the object 262. In the preferred embodiment, the object 262 comprises five fields, a status field 264, an identifier field 266, a data field 268, a pointer field 268 and a timestamp field 272. Apart from the status field 264, the object 262 need not contain all of the other fields and the status field 264 contains flags that indicate those fields that an object contains. The data field 268 stores data such as text and numbers corresponding to the object 262 and the pointer field 268 contains a pointer to a prior version of the object 262. The timestamp field 272 indicates when the object 262 was created and the identifier field 266 contains a number identifying the object 262 that is used in the table 260.

Because prior versions of the data item cannot be removed, deleting a data item must be handled specially. To delete a data item, a special marker called a 'tombstone' is written to the journal partition to signify that the data item was deleted. The tombstone comprises an object with a data field that has no value and a special status flag is set to show that the item is a tombstone. The tombstone object stores a pointer to an object that contains the last version of the data item to be deleted.

To read a data item, the most recent version of the data item is retrieved by looking up the appropriate block in the table 260. Once the most recent version of a data item has been retrieved by retrieving the item's associated most recent object, prior versions can be retrieved by using the pointer stored within the retrieved object.

Eventually, a user may wish to discard older versions of the data items. This is done by copying the desired data items, generally the most recent, to another file, and discarding the original file.

Figure 12:
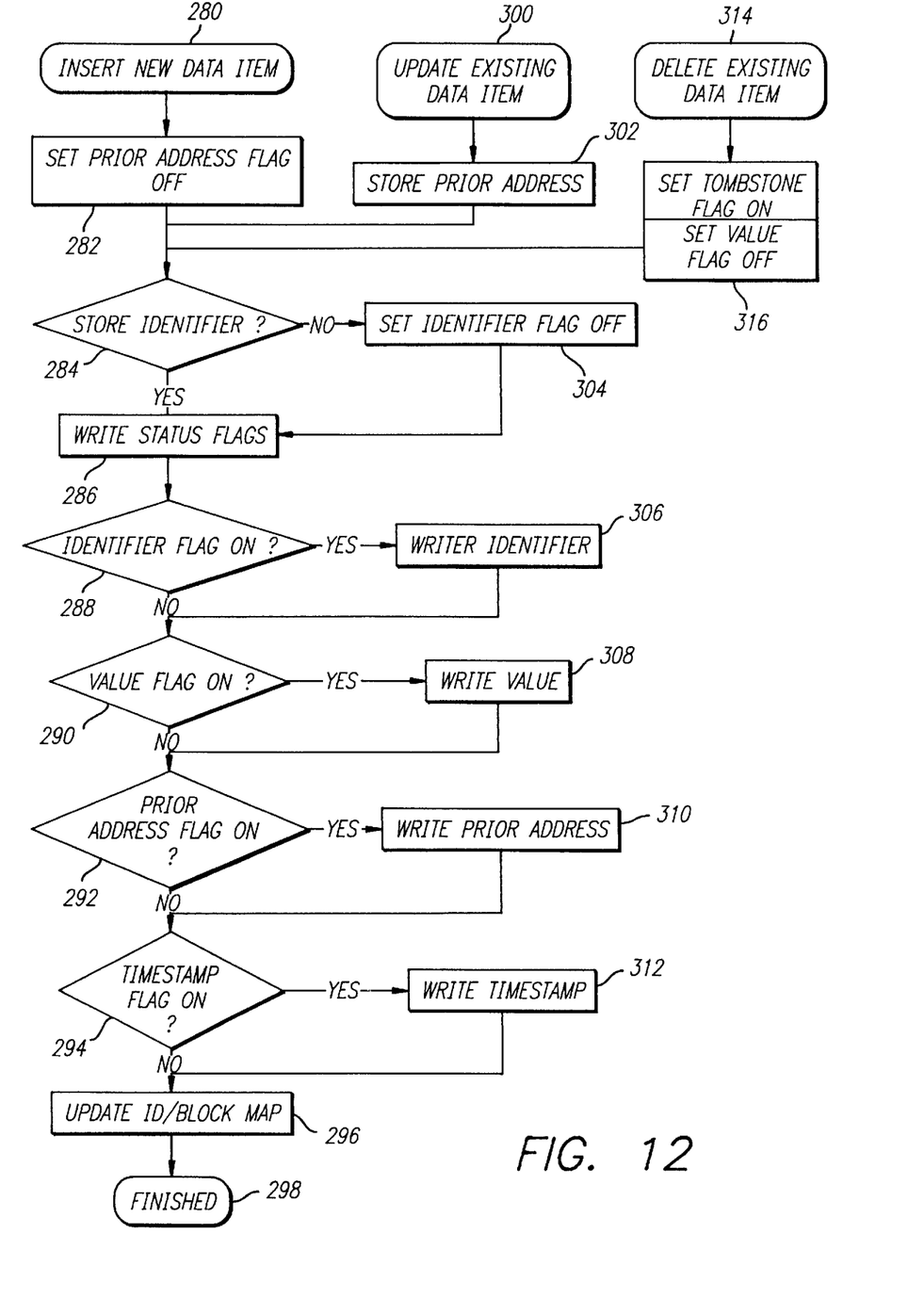
FIG. 12 is a flow chart for inserting, updating, and deleting data items from the journal file.

FIG. 12 is a flow chart for inserting items to the journal partition 58, updating items within the journal partition 58 and deleting data items from the journal partition 58. According to the routine illustrated in FIG. 12, inserting, updating and deleting are performed by a similar method and status flags indicate the difference between the actions.

All three operations include writing a new object to the journal partition 58. In the case of updating an existing data item, the new object includes the updated data and points to the previous version, as previously described. In the case of deleting a data item, a tombstone object is written to the journal partition 58 indicating the deleted data item, as previously described.

At block 280, an insert operation begins and branches to block 282, where the prior address flag is set to FALSE since the insertion of an item implies that there is no prior address to point to. Conversely, when updating an existing data item as indicated in block 300, the system stores the address of the object containing the item to be updated and sets its prior address flag to TRUE as shown in block 302. To delete a data item, as illustrated in block 314, the routine sets the "tombstone" flag to TRUE and the "data value" flag to FALSE, indicating that there is no data in the object being written, and that the object being written implies the deletion of a data item, as shown in block 316.

The system then writes the new object to the journal partition 58. Before writing, the routine may process the new object according to various options. For example, at block 284, the routine determines whether it will store an object identifier in the object identifier field. Storing the identifier is not necessary for retrieval, but can be used to recover data in case of file corruption. If the identifier is not to be stored, block 284 branches to block 304 and the identifier flag is set OFF. Block 304 branches to block 286 where the status flags are written to the journal partition 58.

At block 288, the routine determines whether the identifier flag is TRUE. If so, the system branches to block 306 and the identifier is written to the journal partition 58. The system then branches to block 290, to determine whether the value flag is TRUE. If so, the system writes the data value to the journal partition 58. Similarly, at block 292, the routine determines whether the prior address flag is TRUE. If so, the system branches to block 310 and the prior address is written to the pointer field in the new data object created in the journal partition 58. The system then branches to block 294, to determine whether the timestamp flag is TRUE. If so, the system writes the timestamp to the timestamp field of the new object created in the journal partition 58.

Finally, the table 260 is updated to reflect the new location of the data item on disk corresponding to the new object written to the journal partition 58.

This approach allows for various options. For example, for all items, it is optional to store the identifier. If the identifier, timestamp, and prior pointer are not stored, the required storage size of the data item is minimal.

Data Recovery

In the preferred embodiment, the structure of the table 260 is a standard extendible hash table data structure. As previously described, the table 262 is updated every time a new object is written to the journal partition 58. Since the table 260 may become quite large, to avoid saving it, by writing it to a non-volatile memory, every time it is updated, a checkpoint approach is used whereby the table 260 is saved at certain user-defined intervals. For example, a user may specify that the table should be saved after every 50 updates.

Figure 13:
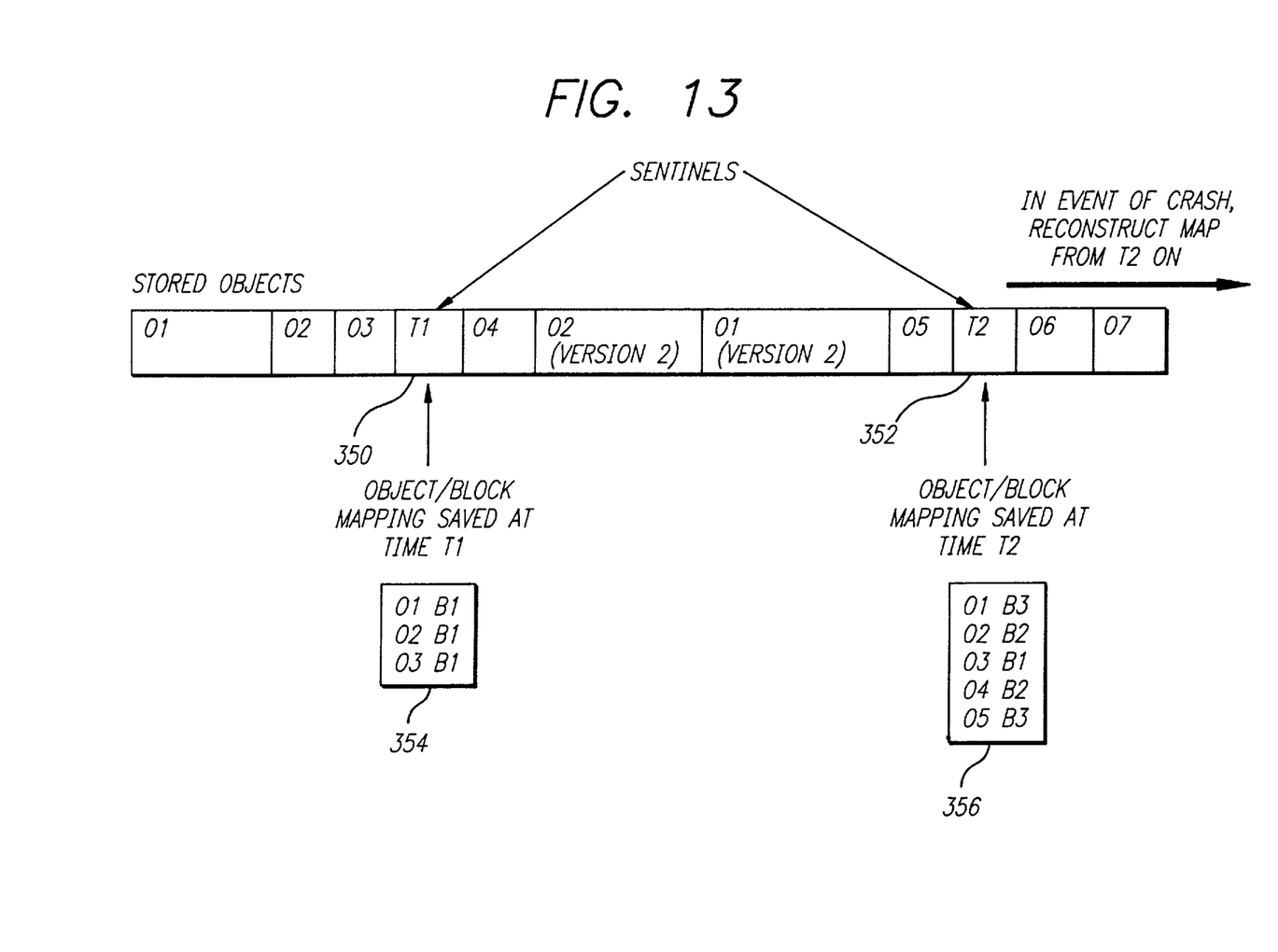
FIG. 13 illustrates the "sentinel" feature of the present invention for storing tab that map objects stored in the journal file to blocks of physical memory.

After the table 262 is saved, a "sentinel" is written to the journal partition 58. FIG. 13 illustrates "sentinel" data object. "Sentinel" objects 350 and 352 each contain a timestamp and pointers to tables 354 and table 356 respectively. The tables 354 and 356 comprise versions of the table 260 and are stored in non-volatile memory when the "sentinel" objects are written to the journal partition 58.

If a crash occurs, the system need only reconstruct the table 260 since the actual data is already stored on the journal partition 58. Reconstructing the table 260 can start from the last valid sentinel, rather than from the beginning of the file, which greatly increases the speed of recovery.

According to the preferred embodiment of the routine for reconstructing the table 260, the most recent "sentinel" object is located by reading backward from the end of the journal. This will be the last point at which the table 260 was still valid. The sentinel will contain a pointer to the disk file that stores the table 262 and the table 262 may then be loaded from this file. If the table 262 is missing or damaged, the routine then attempts to find a "sentinel" object check point that is earlier in the journal file. This process continues until a valid "sentinel" object is found or the beginning of the journal file is reached.

Next, the journal partition 58 is read, starting at the next object written to the journal partition 58 after the "sentinel," if any, is located that points to a valid table. For each subsequent object in the journal partition 58, the table 260 is updated. Finally, a new "sentinel" is created and the new table 260 is saved.

Optimization

The object orientation of this storage system enhances the efficiency of various operations. For example, the copending Application entitled "Method and Apparatus for Improved Information Storage and Retrieval System" filed Mar. 28, 1995, Ser. No. 08/383,752, now U.S. Pat. No. 5,729,730 discloses a database that comprises a table with rows and columns. The rows correspond to records and the columns correspond to fields. The intersection of the rows and the columns comprise cells, which correspond to the data items of the present invention. Thus, a cell is stored as a data object according to the teachings of the present invention. Certain database operations, such as I. Using shared data in a distributed or disconnected network II. replicating, synchronizing and merging data at the cell level, and merging indexes III. recovery of damaged or missing data IV. searching cells by column rather than by row, are enhanced by storing the database of the copending application according to the teachings of the present invention.

Furthermore, the physical arrangement of cells on the storage medium is flexible and can be adjusted for various requirements. For example, if a particular column or set of columns is searched regularly, the cells comprising these columns may be kept adjacent to each other in a partition. Alternatively, the cells may be separated from the main storage file and stored in a distinct file, called a 'stripe'.

The information contained in some data items is redundant and can be reconstructed from 'original' information corresponding to parent data items, as previously described. With reference to the copending Application entitled "Method and Apparatus for Improved Information Storage and Retrieval System" filed Feb. 3, 1995, Ser. No. 08/383,752, now U.S. Pat. No. 5,729,730, for example, the contents of a folder, which is a record that points to a group of records, can be reconstructed by gathering all of the 'parent folder' attributes of the data items. Similarly, indexes and other navigation structures can often be reconstructed.

For these kinds of reconstructible data items, a special storage technique can be used. The contents of the data item are stored in a special location, distinct from the journal partition. This location may be reused every time the reconstructible data item is written which saves memory space and time. The journal then contains a pointer to this external location, instead of the actual data itself. If, for some reason, the external location is missing or damaged, the data item can be reconstructed using an appropriate method.

Summary

While the invention has been described in conjunction with the preferred embodiment illustrated in FIGS. 1–13, it is evident that numerous alternatives, modifications, variations and uses will be apparent to those skilled in the art in light of the foregoing description. For example, the present invention may be employed for network topologies other than client-server architectures such as ring topologies. Many other adaptations of the present invention are possible.

I claim:

1. A method for providing simultaneous access to a common file on a computer network comprising at least one computer, said method including the steps of:

partitioning a first memory on said at least one computer to provide a first user with a first partition to store updates to files corresponding to said first user, said first memory at least partially inaccessible to a second user;

partitioning a second memory on said at least one computer to provide said second user with a second partition to store updates to files corresponding to said second user, said second memory at least partially inaccessible to said first user;

partitioning a third memory on said at least one computer to store selected updates from said first and second user partitions to create a first common partition such that said first and second users have associated partition chains comprising said first and second partitions, respectively, and said common partition;

storing first user update data in said first partition while maintaining common data unchanged, said first user update data corresponding to chases to said common data file by said first user;

storing second user update data in said second partition while maintaining common data unchanged, said second user update date corresponding to changes to said common data file by said second user;

selectively storing desired updates from said first and second partitions in said first common partition; and providing each of said first and second users access to said first common partition.

2. The method of claim 1 wherein said first and second partitions and said first common partition reside on different computers.

3. The method of claim 1 wherein said first common partition comprises a library partition.

4. The method of claim 1 further comprising the steps of:

defining a second common partition accessible to said first and said second users; and linking said second common partition to said first and second user partition chains.

5. The method of claim 4 wherein said second common partition comprises an archive partition.

6. The method of claim 5 further comprising the step of: merging selected data updates from said first common partition to said second common partition.

7. The method of claim 1 further comprising the steps of: defining a new partition based upon a subset of said first partition; and
linking said new partition to said second user's partition chain.

8. The method of claim 7 wherein said new partition includes an update or an annotation to a CD-ROM.

9. The method of claim 1 wherein the step of merging selected first and or second update data from said first and or second partitions respectively into said first common partition further comprises:
selecting between conflicting data of said first and second update data in accordance with specified criteria for replacing said common data in said same data field, in the event that a first user selected data field and a second user selected data field are the same data field in said first common partition.

10. A method for providing simultaneous access to a common file on a computer network, said network including at least two local computers and at least one remote computer coupled to each of said at least two local computers, said method including the steps of:
partitioning memories on said local computers into journal partitions;
storing updates to said file, while maintaining common data unchanged, in user update files on respective said journal partitions;
partitioning memories on said local computers into local library partitions;
storing information from respective user update files of said journal partitions while maintaining common data unchanged;
updating at least one of said user update files while its associated computer is disconnected from said remote computer;
transmitting said updates from said associated computer to said remote computer after said remote computer is reconnected with said associated computer;
receiving updates on said remote computer from each of said at least two local computers;
partitioning a memory on said remote computer into a remote partition that stores said updates from said at least two local computers; and
merging said updates from said at least two local computers into said remote partition.

11. A storage system for a computer network simultaneously accessible by at least a first and second user, comprising:
at least one physical storage device,
a common partition defined in sa id a t least one physical storage device storing common data which is accessible to said first and second users;

a first update partition defined in said at least one physical storage device storing first update data from said first user representing changes to said common data in first user selected data fields in said common partition while maintaining common data unchanged, said first update data in said first partition is at least partially inaccessible to said second user;

a second update partition defined in said at least one physical storage device storing second update data provided by said second user representing changes to the common data in second user selected data fields in said common partition while maintaining common data unchanged, said second update data in said second partition is at least partially inaccessible to said first user;

means for linking two or more partitions together to form partition chains; and means for selectively merging said first and second update data in to said common partition at a desired time so as to replace the common data in said first and second user selected data fields with said first and second update data.

12. The device of claim 11 wherein said update data and said common data is masked from visibility by subsequent partitions in said partition chains.

13. A method for providing simultaneous access by at least a first and second user to a common data file on a computer network comprising at least one physical storage device, said method including the steps of:
defining a first common partition on said at least one physical storage device accessible to said first and said second users;
defining a first update partition on said at least one physical storage device, said first update partition accessible to said first user and at least partially inaccessible to said second user;
forming a first user partition chain by linking said first common partition and said first update partition;
storing first user update data in said first update partition while maintaining common data unchanged, said first user update data corresponding to changes to said common data file by said first user;
is defining a second update partition on said at least one physical storage device, said second update partition accessible to said second user and at least partially inaccessible to said first user;
forming a second user partition chain by linking said first common partition and said second update partition;
storing second user update data in said second update partition while maintaining common data unchanged, said second user update data corresponding to changes to said common data file by said second user;
merging selected first and or second update data from said first and or second update partitions respectively into said first common partition.

* * * * *